United States Patent Office 3,475,409
Patented Oct. 28, 1969

3,475,409
PROCESS FOR PREPARING RIBONUCLEOSIDE-5'-MONOPHOSPHATE
Shunji Ouchi, Hiraku Yamada, and Naohito Kameyama, Tokyo, Masakazu Kurihara, Warabi, Saburo Senoh, Tokyo, and Tuneo Sowa, Nobeoka, Japan, assignors to Asahi Kasei Kogyo Kabushiki Kaisha, Osaka, Japan
No Drawing. Filed May 23, 1967, Ser. No. 640,467
Claims priority, application Japan, July 14, 1966, 41/45,612
Int. Cl. C07c 51/50
U.S. Cl. 260—211.5
7 Claims

ABSTRACT OF THE DISCLOSURE

Process for preparing ribonucleoside-5'-monophosphates of the general formula:

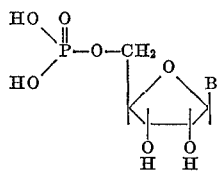

wherein B represents a member selected from the group consisting of purine and pyrimidine bases, which comprises reacting ribonucleosides of the general formula:

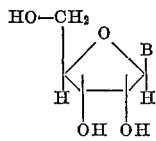

wherein B has the same meaning as defined above with a mixture consisting of polar organic solvent, phosphorus oxychloride, water and organic base, and mixing the resulting reaction mixture with water thereby effecting the hydrolysis reaction thereof.

BACKGROUND OF THE INVENTION

Field of the invention

This invention relates to a novel phospho-esterification of ribonucleoside, and more particularly, it relates to a process for preparing nucleoside-5'-monophosphate preferentially by phosphorylating 2',3'-O-unprotected nucleoside with phosphorus oxychloride as illustrated in the following chemical equation:

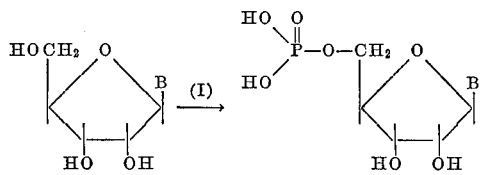

wherein B represents purine and pyrimidine bases.

Description of the prior art

Some attempts have been made heretofore to phosphorylate unprotected nucleoside, for example, Gulland and Hobday studied a reaction of guanosine with phosphorus oxychloride in pyridine as reported in the Journal of Chemical Society, 1940, 746–752, and Baker and Foll conducted the similar study with respect to adenosine as described in the Journal of Chemical Society, 1957, 3798–3800.

Yet, the fact that the phosphorylation of unprotected nucleoside is utilized neither industrially nor in laboratory is due to the following two reasons:

In the first place, unprotected nucleoside is more unsusceptible to phosphorylation reaction than protected nucleoside and, as a result, conversion rate of the reaction and, further, selectivity of the phosphorylation are extremely low.

In the second place, the phosphorylation of unprotected nucleoside produces 2'- and 3'-monophosphates, 3' (or 2'), 5'-diphosphate, dinucleoside phosphate, etc. as byproducts other than contemplated 5'-monophosphate.

In order to obtain the desired 5'-monophosphate, therefore, it has been the conventional practice to use a process as illustrated in the following chemical equations:

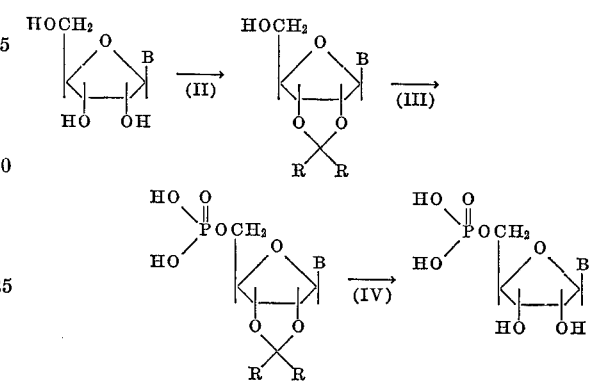

wherein B represents purine or pyrimidine base, and R represents alkyl, aryl group or hydrogen atom.

In the reactions as illustrated above, reaction II is an addition reaction of protecting groups, for example, acetone, to hydroxyl group at 2' or 3'-position, while reaction III is a phosphorylation of 5'-hydroxyl group and reaction IV is a hydrolysis reaction of said protecting groups.

As noted above, in the prior art, 5'-nucleotide has been produced from unprotected nucleoside using a combination of three different reactions, and it is obvious that the reactions II and IV are superfluous and unnecessary steps as compared with the process of this invention as illustrated in the above-shown Equation I.

SUMMARY OF THE INVENTION

An object of this invention is to provide a selective phosphorylation process of ribonucleoside.

Another object of this invention is to provide a process for preparing ribonucleoside-5'-monophosphate from ribonucleoside having unprotected hydroxyl groups by one step reaction in a high yield.

Still another object of this invention is to provide a simple and economical process for preparing ribonucleoside-5'-monophosphate which is useful as chemical condiments.

We have conducted a thorough study of a process for phosphorylating selectively and in one step 5'-hydroxyl group of unprotected nucleoside and, as a result, we have found out that ribonucleoside-5'-monophosphate of the general formula:

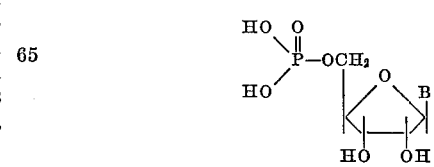

wherein B represents purine or pyrimidine base, may be obtained by treating ribonucleoside of the general formula:

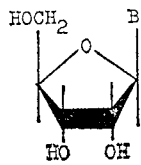

wherein B has the same meaning as defined above, in a mixture solution consisting of polar organic solvent, phosphorus oxychloride and organic base in the presence of a small amount of water, and mixing the resulting reaction mixture with a large amount of water.

In the prior art processes, for example, as reported by the aforementioned Baker and Foll, 5′-, 3′- and 2′-monophosphates are produced in a ratio of 6:3:1 and the yield of 5′-monophosphate is only 6% based on the starting nucleoside, and the conversion rate of the reaction as well as the selectivity of the phosphorylation are extremely low. On the other hand, in the process of this invention, the conversion rate of reaction is almost 100%, and the selectivity of 5′-phosphorylation always exceeds 90%.

The process of this invention may be explained more practically in the following:

First, suitable amounts of polar organic solvent, phosphorus oxychloride, water and organic base are mixed together, and to the resulting mixed solution which is maintained at a suitable temperature is added nucleoside with stirring. The reaction solution, which is initially in the form of suspension, turns to a clear solution gradually as the reaction proceeds. The resulting reaction mixture is poured into a large amount of cold water or ice water to give an aqueous solution thereof. Subsequently, the reaction mixture may be treated in the conventional methods for separating and purifying nucleoside such as by using active charcoal, ion exchange resin, etc., to give 5′-nucleotide.

In practicing the process of this invention, the mixing ratio of organic solvent, organic base, phosphorus oxychloride and water; and selection of proper kinds of the above-mentioned organic solvent and organic base are most important to the present invention.

Although a fairly good result may be obtained by adjusting the mixing ratio of three ingredients excluding water from four of them as mentioned above, an even better and stable result can be obtained by taking the mixing ratio of water into consideration.

Organic solvent which may be used in the process of this invention should essentially be polar solvents and such solvents having a higher dielectric constant are particularly desirable. In the process of this invention, it has been found that nonpolar solvents are absolutely ineffective. Typical examples of these useful solvents include, for example, nitro-compounds such as nitromethane, nitroethane and the like; cyclic ethers such as tetrahydrofuran, dioxane, and the like; nitriles such as acetonitrile, propionitrile and the like; and hydrocarbon halogenides such as dichloromethane and the like, and amongst these as exemplified as above, nitromethane and acetonitrile are particularly preferred.

The amount of these solvents used in the process of this invention varies depending upon the kind of solvent and starting nucleoside used, and further upon the amounts of phosphorus oxychloride, organic base and water charged. However, in general, an amount of from 0.2 to 3 liters per mol of starting nucleoside is preferable for satisfactory result as well as from an economical standpoint. The use of these solvents in an amount less than 0.2 liter per mol of nucleoside causes inconveniences in operation due to greatly increase viscosity of the reaction mixture, while, the use of more than 3 liters per mol of nucleoside requires increase in amounts of phosphorus oxychloride and organic base to be used together therewith, which is undesirable from an economical standpoint. These organic solvents as exemplified above may be used independently or as a mixed solvent of two or more kinds.

The amount of phosphorus oxychloride to be used in the process of this invention has close relations with the kind and amount of organic solvent used and the amounts of organic base and water charged. When organic solvent, organic base and water are used in optimum amounts from the standpoint of economy and reaction yield, an amount of phosphorus oxychloride is preferably from 2 to 12 mols per mol of starting nucleoside. The use of phosphorus oxychloride in an amount less than 2 mols per mol of nucleoside gives very low conversion rate of the reaction, while, on the other hand, the use of more than 12 mols leads to a gradual decrease in the conversion rate of the reaction and the selectivity of 5′-phosphorylation. The compensation for these inconveniences necessitates increased amount of organic solvent, organic base and water, thus, it is undesirable from an economical point of view.

Organic bases used in the process of this invention have great effects on the conversion rate and the selectivity of the reaction. Typical examples of these organic bases include, for example, cyclic tertiary amines such as pyridine, picoline, lutidine, collidine and the like. The use of primary, secondary amines and aliphatic tertiary amines is not advisable in the process of this invention.

The amount of organic base in excess of an equimolar amount per mol of starting nucleoside usually gives a fairly satisfactory result, however, an amount of from 1.5 to 10 mols per mol of nucleoside is most preferable. The use of less than an equimolar amount leads to a remarkable delay in the rate of reaction and decrease in the yield of 5′-nucleotide, while, an amount over 10 mols is not only undesirable from an economical standpoint but also the selectivity of 5′-phosphorylation is adversely affected. These organic bases as exemplified above may be used independently or as a mixture of these.

By selecting the kind of polar organic solvent and adjusting the amounts of the organic solvent, organic base and phosphorus oxychloride as explained above, the 5′-phosphorylation of unprotected nucleoside is effected fairly specifically in a mixed solution containing these three ingredients as mentioned above. When water is added further thereto, the rate of the reaction is accelerated and the selectivity of 5′-phosphorylation is greatly enhanced, and the reproducibility of the reaction is stabilized. The amount of water to be used in the process of this invention has close relations with the amounts of phosphorus oxychloride and organic base charged, and within the optimum range of amounts of said two ingredients, a preferred amount of water is less than 6 mols per mol of the starting nucleoside. If more than 6 mols of water is used, the undesirable side reaction is accelerated, and the quantity of purine base and other by-products produced are increased. When the amount of water is excessively less than an optimum amount, the reproducibility of the reaction becomes unstable and, simultaneously, the yield of 5′-nucleotide is decreased. Further, the amount of water to be used has a close relation with the amount of phosphorus oxychloride charged and an amount of water less than an equimolar amount based on phosphorus oxychloride is preferable.

No particular restriction is imposed on the mode of charging water, however, charging methods which causes an instantaneous reaction of water with phosphorus oxychloride, for example, addition of mixture of organic base and water to phosphorus oxychloride are not advisable.

As noted above, in the process of this invention, 5′-hydroxyl groups of nucleoside having no protecting groups in 2′,3′-O-position may be specifically phosphoesterified at a mixture consisting of polar organic solvent, phosphorus oxychloride, organic base and water which have close interrelations with each other, and the reaction temperature and reaction period are also important conditions of the reaction for a satisfactory result. In the reaction of this invention, like any other chemical reactions, the rate of reaction is increased at higher temperatures and is decreased at lower temperatures. In the phosphorylation of nucleoside, particularly when using phosphorus oxychloride, it should be kept in mind that as the temperature exceeds an optimum temperature, the decompositions of the starting nucleoside and the produced nucleotide become remarkable. The temperature condition in the process of this invention should be determined in connection with the amount of organic base charged, however, in general, a practical temperature ranges from $-30°$ to $30°$ C. within a practical amount of organic base charged. At temperatures higher than the above-mentioned range, the decomposition reaction as mentioned above predominantly takes place which make the process impracticable, while, temperatures lower than said range causes the rate of reaction to be greatly decreased and requires an impractically prolonged reaction period. Hence, considering various reaction conditions as described above, the required reaction period is usually from 30 minutes to 10 hours.

Although the reaction temperature and period have some influences on the visual appearance of reaction mixture and the selectivity of 5'-phosphorylation, they are not as strict as the charging proportion of those reaction ingredients as explained in the above.

DESCRIPTION OF THE PREFERRED EMBODIMENTS

The following examples will serve to illustrate the process of this invention more practically, however, it should not be construed that these examples restrict this invention as they are given merely by way of illustration.

Example 1

To a mixed solution containing 20 ml. of acetonitrile, 8 ml. of phosphorus oxychloride, 1 ml. of water and 7.9 ml. of pyridine, which was maintained at $0°$-$2°$ C. were added 5.4 g. of inosine with stirring. After stirred for 4 hours, the reaction mixture was poured into about 500 ml. of cold water and further stirred for about 1 hour at $0°$-$5°$ C.

To the resulting aqueous solution was added an aqueous solution of sodium hydroxide to adjust the pH of the resulting mixture at about 1, which contained 99% of phosphate compounds and 96% of inosine-5'-monophosphate. Then, the mixture was allowed to pass through a column containing 50 g. of active carbon thereby adsorbing inosinic acid. After said column was washed with 0.1 N aqueous hydrogen chloride and a small amount of water, the content was eluted with a mixture solution of 3%-ammonia-10% methanol-water, and the resulting eluent was dried under a reduced pressure. The residue obtained was dissolved in a small amount of water and allowed to pass through a column containing about 20 ml. of Amerlite 200, H-form, and washed with water. To the combination of effluent and washings was added an aqueous solution of sodium-hydroxide to make pH 7.7, and the mixture was concentrated under a reduced pressure to give a syrup. After the concentrated solution was allowed to stand overnight in an ice-box, crystals formed out were filtered off and dried at $110°$ C. under a reduced pressure to afford 7.1 g. of disodium inosine-5'-monophosphate having a purity of 98%. Further, a small amount of sodium inosinate was obtained from the filtrate by adding alcohol thereto and allowing the mixture to stand for some time.

Example 2

The experiment of Example 1 was repeated according to the same procedures as described therein except that 10 ml. of $\alpha$-picoline was substituted for pyridine. As a result, 7.2 g. of sodium inosinate having a purity of 95% was obtained.

Example 3

To a mixed solution consisting of 20 ml. of acetonitrile containing 10% of propionitrile, 8 ml. of phosphorus oxychloride, 1 ml. of water and 8 ml. of $\alpha$-picoline, which was maintained at $0°$-$5°$ C., was added 5.4 g. of inosine with stirring and the reaction was carried out for about 5 hours.

By following the same procedures as in Example 1 thereafter, 7.1 g. of sodium inosinate having a purity of 97% was obtained.

Example 4

To a mixed solution containing 60 ml. of nitromethane, 24 ml. of phosphorus oxychloride, 2.6 ml. of water and 23.7 ml. of pyridine, which was maintained at about $5°$ C., were added 17 g. of guanosine with stirring. After the reaction was effected for about 5 hours, the reaction mixture was poured into about 2 liters of cold water and stirred for about 1.5 hours and then allowed to stand still. The resulting aqueous solution which contained 2% of guanosine, 1% of guanine, 92% of guanosine-5'-monophosphate and 5% of other phosphates, was allowed to pass through a column containing 150 g. of active carbon and washed with water. Said column was then eluted with 2.5 liter of 0.25 N aqueous sodium hydroxide and the eluent was subsequently allowed to pass through a column containing about 50 ml. of Amberlite 200, H-form, and washed with water. To the combination of effluent and washings thus obtained was added sodium hydroxide and pH of the resulting mixture was adjusted at 7.6, and the mixture was concentrated under a reduced pressure to give about 100 ml. of concentrated solution. The resulting concentrated solution was added with 300 ml. of methanol and was allowed to stand overnight in a refrigerator. The crystals formed out were then filtered off and dried to give 20.6 g. of disodium guanosine-5'-monophosphate containing 97% of 5'-guanylate, and 1% of other phosphates.

Example 5

To a mixed solution consisting of 60 ml. of acetonitrile, 24 ml. of phosphorus oxychloride, 2.6 ml. of water and 24 ml. of picoline containing $\alpha$-, $\beta$-, $\gamma$-picoline and 2,6-lutidine in a ratio of 7:1:1:1, which was maintained at $0°$-$2°$ C., were added 17 g. of guanosine and the reaction was carried out for about 6 hours. By following the same procedures as in Example 4 thereafter, 19.5 g. of sodium guanylate, containing 96% of guanosine-5'-monophosphate and 2% of other phosphates, was obtained.

Example 6

The experiment of Example 4 was repeated in the same procedures as described therein except that acetonitrile and 16 g. of adenosine were substituted for nitromethane and guanosine, respectively. As a result, 20 g. of sodium adenylate, containing 95% of adenosine-5'-monophosphate and 2% of other by-products from adenosine, was obtained.

Example 7

To a mixed solution containing 20 ml. of dichloromethane, 10 ml. of phosphorus oxychloride, 1.2 ml. of water and 9.5 ml. of pyridine, which was maintained at $5°$-$7°$ C., were added 5.4 g. of inosine with stirring and the reaction was effected for 4 hours. By following the same procedures as in Example 1 thereafter, 6.8 g. of sodium inosinate, containing 90% of 5'-monophosphate and 3% of other phosphates, was obtained.

Example 8

The experiment of Example 1 was repeated in the same procedures as described therein except that 5.7 g. of xanthosine was substituted for inosine. As a result, 6.6 g. of pure sodium xanthosine-5'-monophosphate was obtained.

Example 9

To a mixed solution containing 20 ml. of acetonitrile, 8 ml. of phosphorus oxychloride and 7.9 ml. of pyridine, which was maintained at 0°–2° C., were added 5.8 g. of inosine dihydrate. By following the same procedures as in Example 1 thereafter, 6.0 g. of 5′-inosinate having a purity of 90% was obtained.

Example 10

To 15 ml. of acetonitrile were added 6 ml. of phosphorus oxychloride, 0.72 ml. of water and 7.2 ml. of α-picoline. To the resulting mixture which was maintained at 0°–2° C. were added 3.7 g. of cytidine with stirring. By following the same procedures as in Example 1 thereafter, 5.0 g. of disodium cytidine-5′-phosphate having a purity of 99% was obtained.

Example 11

The experiment of Example 10 was repeated according to the same procedures as described therein except that 3.7 g. of uridine was substituted for cytidine. As a result, 5.1 g. of disodium uridine-5′-phosphate having a purity of 97% was obtained.

What is claimed is:

1. Process for preparing a ribonucleoside-5′-monophosphate of the formula:

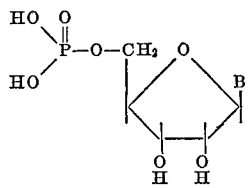

wherein B represents a member selected from the group consisting of purine and pyrimidine bases, which comprises reacting a ribonucleoside of the formula:

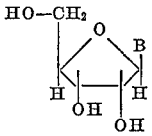

wherein B has the same meaning as defined above with a mixture consisting of
    (a) at least one polar organic solvent, the total of which is present in an amount of 0.2–3.0 liters per mol of nucleoside,
    (b) phosphorus oxychloride in an amount of 2–12 mols per mol of nucleoside,
    (c) water in an amount of less than 6 mols per mol of nucleoside,
    (d) at least one cyclic tertiary amine the total of which is present in an amount of 1–10 mols per mol of nucleoside, at a temperature of −30° C. to 30° C. and mixing the resulting reaction mixture with water thereby effecting the hydrolysis reaction thereof.

2. Process according to claim 1 wherein a single polar organic solvent is used.

3. Process according to claim 1 wherein the amount of water used is less than an equimolar amount based on phosphorus oxychloride used.

4. Process according to claim 1 wherein a single cyclic tertiary amine is used.

5. Process according to claim 1 wherein the reaction products and unreacted raw materials, mainly phosphorus oxychloride, are hydrolized by mixing the reaction mixture with water.

6. Process according to claim 1 wherein at least 2 polar organic solvents are used in admixture.

7. Process according to claim 1 wherein at least 2 cyclic tertiary amines are used in admixture.

References Cited

UNITED STATES PATENTS

| | | | |
|---|---|---|---|
| 3,201,389 | 8/1965 | Fujimoto et al. | 260—211.5 |
| 3,375,244 | 3/1968 | Ouchi et al. | 260—211.5 |
| 3,382,232 | 5/1968 | Honjo et al. | 260—211.5 |

LEWIS GOTTS, Primary Examiner

JOHNNIE R. BROWN, Assistant Examiner